(12) United States Patent
Cho et al.

(10) Patent No.: US 8,799,526 B2
(45) Date of Patent: Aug. 5, 2014

(54) MEDIA PLAYER DEVICE AND METHOD FOR WAKE-UP THEREOF

(75) Inventors: Bong-hwan Cho, Suwon-si (KR); Seung-kwon Park, Yongin-si (KR); Il-ju Na, Yongin-si (KR); Jae-min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 13/116,126

(22) Filed: May 26, 2011

(65) Prior Publication Data

US 2011/0296058 A1 Dec. 1, 2011

Related U.S. Application Data

(60) Provisional application No. 61/348,341, filed on May 26, 2010.

(30) Foreign Application Priority Data

Mar. 3, 2011 (KR) ........................ 10-2011-0019115

(51) Int. Cl.
*G06F 3/00* (2006.01)
*G06F 1/32* (2006.01)

(52) U.S. Cl.
CPC ............... *G06F 1/3206* (2013.01); *Y02B 60/32* (2013.01); *Y02B 60/34* (2013.01); *G06F 1/3203* (2013.01); *G06F 1/3287* (2013.01)
USPC .............................................. 710/14; 710/18

(58) Field of Classification Search
CPC ... G06F 1/3203; G06F 1/3206; G06F 1/3287; Y02B 60/32; Y02B 60/34

USPC ........................................................ 710/14, 18
See application file for complete search history.

(56) References Cited

U.S. PATENT DOCUMENTS

| 5,814,973 | A | * | 9/1998 | Liu ................................ 320/137 |
| 6,480,965 | B1 | * | 11/2002 | Harriman et al. ............. 713/322 |
| 6,665,801 | B1 | * | 12/2003 | Weiss ............................. 713/300 |
| 8,386,680 | B2 | * | 2/2013 | Schubert et al. .............. 710/105 |
| 2005/0076252 | A1 | * | 4/2005 | Birmingham ................. 713/310 |
| 2005/0076256 | A1 | * | 4/2005 | Fleck et al. ................... 713/320 |
| 2005/0239518 | A1 | * | 10/2005 | D'Agostino et al. ......... 455/574 |
| 2006/0129862 | A1 | | 6/2006 | Liu et al. |

(Continued)

FOREIGN PATENT DOCUMENTS

| EP | 1146415 A1 | 10/2001 |
| EP | 1868299 A2 | 12/2007 |
| WO | 2009/144626 A1 | 12/2009 |
| WO | 2011/093901 A1 | 8/2011 |

OTHER PUBLICATIONS

Communication, dated Apr. 5, 2012, issued by the European Patent Office in corresponding European Application No. 11163242.8.

*Primary Examiner* — Henry Tsai
*Assistant Examiner* — Eric Oberly
(74) *Attorney, Agent, or Firm* — Sughrue Mion, PLLC

(57) ABSTRACT

A media player device and a method for wake-up thereof are provided. The method includes: when the media player device is in a standby mode, checking whether an external device is connected to the plurality of contact locations; and if the external device is connected to the media player device, waking up the media player device.

30 Claims, 13 Drawing Sheets

(56) References Cited

U.S. PATENT DOCUMENTS

| | | |
|---|---|---|
| 2007/0055795 A1 | 3/2007 | Seo et al. |
| 2007/0214222 A1* | 9/2007 | Chang et al. .................. 709/206 |
| 2008/0178022 A1* | 7/2008 | Anderson et al. ............. 713/320 |
| 2008/0288802 A1* | 11/2008 | Fleck et al. ................... 713/324 |
| 2009/0055666 A1 | 2/2009 | Yee |
| 2009/0193157 A1 | 7/2009 | Chen |
| 2009/0307511 A1* | 12/2009 | Fiennes et al. ................ 713/323 |
| 2011/0080367 A1* | 4/2011 | Marchand et al. ............ 345/174 |

\* cited by examiner

FIG. 3

| | Pin | Name | Description |
|---|---|---|---|
| NIF Mobile | 1 | Lane0+ | Video+ |
| | 2 | Lane0− | Video− |
| | 3 | Lane1+ | Data+ |
| | 4 | Lane1− | Data− |
| | 5 | NIF GND | Ground |

FIG. 4

| | Pin | Name | Description |
|---|---|---|---|
| Mini/Micro USB | 1 | VCC | +5V |
| | 2 | D− | Data− |
| | 3 | D+ | Data+ |
| | 4 | ID | Detect Host/Device |
| | 5 | GND | Ground |

| START | HIGH TO LOW |
| WAKEUP PORT | WAKEUP SIG PORT |
| WAKEUP MODE | SPECIFY TYPE WHICH IS WOKEN UP |
| ACK | ACKNOWLEDGE SUCCESSFUL RECEIPT OF WAKE-UP SIGNAL |

FIG. 13

| Wakeup Mode | meaning |
|---|---|
| 1010 | Wakeup 1 step |
| 1011 | Wakeup 2 step |
| 1100 | Wakeup 3 step |
| 1101 | charging only |
| others | Normal step |

FIG. 14

| off | Power cord unplug state |
|---|---|
| standby | Basic detection from IR receiver and NIF line |
| Wakeup1 | Non-IP based communication (EDID reading/device address/other command) |
| Wakeup2 | IP based communicatiion (CPU based) |
| Wakeup3 | Switch function with multi-port |
| Wakeup? | Other function step except full function |
| Normal | All function works |

MEDIA PLAYER DEVICE AND METHOD FOR WAKE-UP THEREOF

CROSS-REFERENCE TO RELATED APPLICATIONS

This application claims priority from U.S. Provisional Patent Application No. 61/348,341, filed on May 26, 2010, in the United States Patent and Trademark Office, and Korean Patent Application No. 10-2011-0019115, filed on Mar. 3, 2011, in the Korean Intellectual Property Office, the disclosures of which are incorporated herein by reference in their entirety.

BACKGROUND

1. Field

Apparatuses consistent with exemplary embodiments relate to a media player device and a method for wake-up thereof, and more particularly, to a media player device which can maintain a standby using minimum standby power and perform a wake-up according to a signal received from an external device, and a method for wake-up thereof.

2. Description of the Related Art

Since recent electronic devices are connected to various types of external devices, various types of interfaces are supported to connect the recent electronic devices to the various types of external devices. For example, a recent television (TV) supports a high definition multimedia interface (HDMI), a universal serial bus (USB) interface, a Micro USB interface, etc.

It has been important to perform a wake-up according to a wake-up signal received from an external device while maintaining minimum standby power. A conventional interface type transmits a wake-up signal using a specific terminal. However, if an additional terminal is specified to transmit a wake-up signal, use efficiency of the additional terminal is lowered.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a media player device which can maintain a standby using minimum standby power and perform a wake-up according to a signal received from an external device, and a method for wake-up thereof.

According to an aspect of an exemplary embodiment, there is provided a method for waking up a media player device including a plurality of contact locations supporting a plurality of interfaces. The method may include: when the media player device is in a standby mode, checking whether an external device is connected to the plurality of contact locations supporting the plurality of interfaces; and if the external device is connected to the media player device, waking up the media player device.

The plurality of contact locations may include: a first pair contact location group which transmits first data; and a second pair contact location group which transmits second data, wherein whether the external device is connected to the plurality of contact locations is checked through the first pair contact location group.

The first pair contact location group may include a first pair plus contact location and a first pair minus contact location for differential signaling.

Whether the external device has been connected to the plurality of contact locations may be checked using an audiovisual (A/V) data transmission-only contact location of the plurality of contact locations.

If a wake-up signal is received from the external device, the media player device may be woken up.

The wake-up signal may include a start field which signals a start of a wake-up command, a wake-up mode field which signals a mode of a wake-up, and an Ack signal field.

The mode of the wake-up may include a plurality of wake-up modes respectively corresponding to a plurality of operation modes of the media player device and a charging-only mode.

The plurality of wake-up modes may include: a first wake-up mode in which the media player device does not perform Internet Protocol (IP)-based communication; a second wake-up mode in which the media player device performs IP-based communication; a third wake-up mode in which the media player device supports a multiport; and a fourth wake-up mode in which the media player device performs all functions.

The start field may be a signal which is decreased from a high level to a low level and then maintained on the low level for a preset time, or a signal which is increased from the low level to the high level and then maintained on the high level for a preset time.

The wake-up signal may be transmitted using an A/V data transmission-only contact location of the plurality of contact locations.

The media player device may be connected to a plurality of external devices through the plurality of contact locations.

The plurality of contact locations may include a plurality of pair contact location groups which transmit specific data, wherein the plurality of pair contact location groups are respectively connected to the plurality of external devices.

The plurality of contact locations may be mapped to correspond to at least one of a high definition multimedia interface (HDMI) connector, a Micro universal serial bus (USB) connector, a Mini USB connector, a USB connector, a mobile high-definition link (MHL) connector, and a digital interface for video and audio (DiiVA) connector.

According to an aspect of another exemplary embodiment, there is provided a media player device including a plurality of contact locations supporting a plurality of interfaces. The media player device may include: a power unit which outputs standby power or main power; an interface unit which senses whether an external device is connected to the plurality of contact locations; and a controller which controls the power unit to wake up the media player device if the external device is connected to the media player device, The plurality of contact locations may include: a first pair contact location group which transmits first data; and a second pair contact location group which transmits second data, wherein the interface unit checks whether the external device is connected to the media player device, through the first pair contact location group.

The first pair contact location group may include a first pair plus contact location and a first pair minus contact location for differential signaling.

The interface unit may check whether the external device is connected to the media player, using an A/V data transmission-only contact location of the plurality of contact locations.

The controller may wake up the media player device if a wake-up signal is received from the external device connected to the media player device.

The wake-up signal may include a start field which signals a start of a wake-up command, a wake-up mode field which signals a mode of a wake-up, and an Ack signal field.

The mode of the wake-up may include a plurality of wake-up modes respectively corresponding to a plurality of operation modes of the media player device and a charging-only mode.

The plurality of wake-up modes may include: a first wake-up mode in which the media player device does not perform IP-based communication; a second wake-up mode in which the media player device performs IP-based communication; a third wake-up mode in which the media player device supports a multiport; and a fourth wake-up mode in which the media player device performs all functions.

The start field may be a signal which is decreased from a high level to a low level and then maintained on the low level for a preset time, or a signal which is increased from the low level to the high level and then maintained on the high level for a preset time.

The wake-up signal may be transmitted using an A/V data transmission-only contact location of the plurality of contact locations.

The media player device may be connected to a plurality of external devices through the plurality of contact locations.

The plurality of contact locations may include a plurality of pair contact location groups which transmit specific data, wherein the plurality of pair contact location groups are respectively connected to the plurality of external devices.

The interface unit may determine that the external device transmitted a wake-up signal if the wake-up signal is received from the external device, generate a wake-up start command corresponding to the determined external device, and transmit the wake-up start command to the controller. The controller may wake up the media player device if the wake-up start command is received from the interface unit.

The wake-up start command may include a start field which signals a start of a wake-up command, a wake-up port field which signals the media player device which is to be woken up, a wake-up mode field which signals a mode of a wake-up, and an Ack signal field.

The plurality of contact locations may be mapped to correspond to at least one of a HDMI connector, a Micro USB connector, a Mini USB connector, a USB connector, a MHL connector, and a DiiVA connector.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which:

FIG. 3 is a view illustrating an interface structure according to an exemplary embodiment;

FIG. 4 is a view illustrating a Micro universal serial bus (USB) interface structure according to an exemplary embodiment;

FIG. 13 is a view illustrating types of a wake-up mode of FIG. 12;

FIG. 14 is a view illustrating operations of the wake-up mode of FIG. 13;

DETAILED DESCRIPTION OF THE EXEMPLARY EMBODIMENTS

Figure 1:
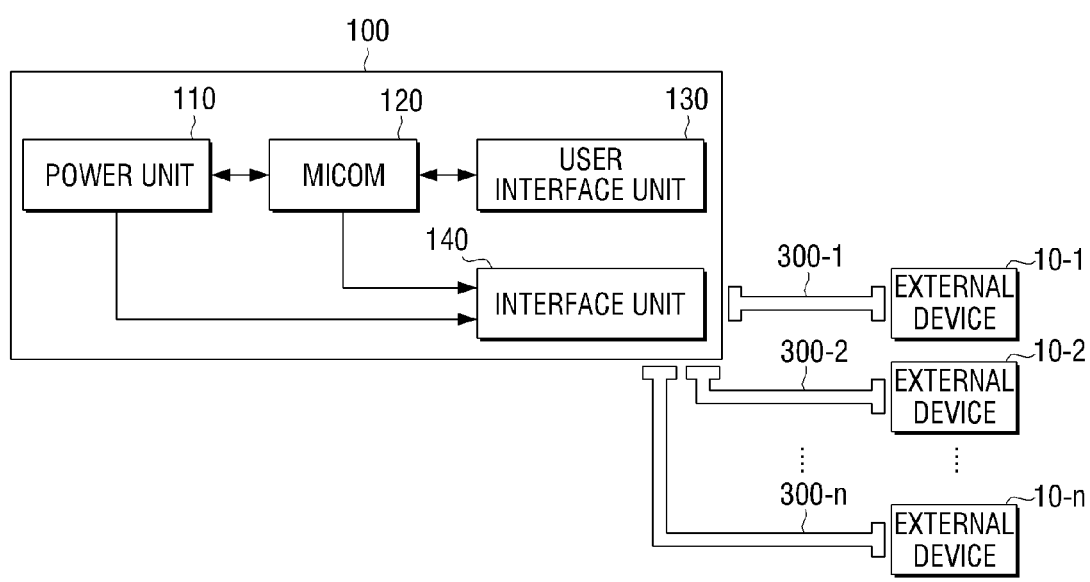
FIG. 1 is a block diagram illustrating a structure of a media player device according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a structure of a media player device 100 according to an exemplary embodiment.

Referring to FIG. 1, the media player device 100 includes a power unit 110, a microcomputer (Micom) 120, a user interface unit 130, and an interface unit 140.

The media player device 100 is connected to external media player devices (hereinafter referred to as external devices) 10-1, 10-2, ..., and 10-n through cable connectors 300-1, 300-2, ..., and 300-n. Examples of the media player device 100 include a broadcast receiver, such as a digital television (DTV), a digital video disc (DVD) player, or a set-top box, a personal computer (PC), a notebook PC, an MPEG Audio Layer-3 (MP3) player, a portable multimedia player (PMP), or a cellular phone storing various types of content, etc.

The power unit 110 supplies power to elements of the media player device 100. The power unit 110 may be realized as a switched-mode power supply (SMPS) or a transformer, and a rectifier circuit.

The power unit 110 outputs other types of power according to an operation state of the media player device 100. For example, if the media player device 100 is in a normal mode, the power unit 110 outputs main power which is normal mode power which can be supplied to all elements of the media player device 100. If the media player device 100 is in a standby mode, the power unit 110 outputs standby mode power which is to be supplied to only some elements of the media player device 100 which are in the standby mode. If the media player device 100 operates in a charging mode for charging the external devices 10-1, 10-2, . . . , and 10-n, the power unit 110 outputs charging mode power which is used to charge some elements in the standby mode and the external devices 10-1, 10-2, . . . , and 10-n.

The Micom 120 controls the elements of the media player device 100. In more detail, the Micom 120 controls the elements of the media player device 100 to perform an operation corresponding to an operation mode of the media player device 100. The media player device 100 may operate in an off mode, a standby mode, a plurality of wake-up modes, a normal mode, etc. as shown in FIG. 14.

The Micom 120 senses whether the external devices 10-1, 10-2, . . . , and 10-n have been connected to the media player device 100. If the media player device 100 is in the standby mode, and the external devices 10-1, 10-2, . . . , and 10-n are connected to the media player device 100, the Micom 120 wakes up the media player device 100. The Micom 120 may be realized to control the elements of the media player device 100 in order to wake up the media player device 100 if a wake-up signal is received from the external devices 10-1, 10-2, . . . , and 10-n.

The Micom 120 generates a wake-up start command for performing a wake-up with respect to the external devices 10-1, 10-2, . . . , and 10-n. In more detail, the Micom 120 generates a wake-up start command to wake up the external device 10-1 according to a control command of a user or internal rules and transmits the wake-up start command to the interface unit 140. For example if the media player device 100 is a DVD player, and the user instructs the DVD player to play a DVD using a remote controller, the Micom 120 generates a wake-up start command with respect to the external device 10-1 to wake up the external device 10-1 which is a DTV and transmits the wake-up start command to the interface unit 140. A detailed structure of the generated wake-up start command will be described later with reference to FIG. 11.

If the external device 10-1, which is chargeable, is connected to the interface unit 140, the Micom 120 controls the power unit 110 to supply power to the external device 10-1. In more detail, if the external device 10-1, which is connected to the media player device 100 through the interface unit 140, is recognized as a chargeable device, the Micom 120 controls the power unit 110 to supply charging mode power or normal mode power to the external device 10-1 through the interface unit 140. Here, if the external device 10-1 is completely charged or is disconnected from the media player device 100, the Micom 120 shuts off power which is supplied to the external device 10-1.

The user interface unit 130 includes a plurality of function keys through which the user can set or select various types of functions supported by the media player device 100. The user interface unit 130 may be realized as a device which simultaneously realizes an input and an output, such as a touch pad or the like. The user interface unit 130 may also be realized as a device into which an input device, such as a keyboard, a mouse, or a wireless remote controller, and an output device, such as a liquid crystal display (LCD), a cathode-ray tube (CRT), or a speaker, are unified.

The user interface unit 130 outputs contents of the media player device 100 or contents of the external devices 10-1, 10-2, . . . , and 10-n which are transmitted through the interface unit 140.

If the external device 10-1 is connected to the media player device 100, the user interface unit 130 displays the connection of the external device 10-1 to the media player device 100. If the external device 10-1 connected to the media player device 100 is being charged, the user interface unit 130 also displays a charge state of the external device 10-1.

The interface unit 140 is formed to connect the media player device 100 to the external devices 10-1, 10-2, . . . , and 10-n. In more detail, the interface unit 140 is connected to the external devices 10-1, 10-2, . . . , and 10-n through the cable connectors 300-1, 300-2, . . . , and 300-n and transmits an audio-visual (A/V) signal to the external devices 10-1, 10-2, . . . , and 10-n. The interface unit 140 transmits a wake-up signal to wake up the external devices 10-1, 10-2, . . . , and 10-n or supplies charging power for charging the external devices 10-1, 10-2, . . . , and 10-n.

It has been described with reference to FIG. 1 that the interface unit 140 is connected to one external device 10-1 through one cable connector 300-1. However, if a cable connector is 1:n, the interface unit 140 may be connected to a plurality of external devices through one cable connector.

Also, it has been described with reference to FIG. 1 that the Micom 120 directly senses the connections of the external devices 10-1, 10-2, . . . , and 10-n, and the wake-up signal is received from the external devices 10-1, 10-2, . . . , and 10-n. However, a connection sensing operation and a wake-up signal receiving operation as described with reference to FIG. 1 may be performed by the interface unit 140. This will be described later with reference to FIG. 9.

A detailed structure of the interface unit 140 will now be described with reference to FIG. 2.

Figure 2:
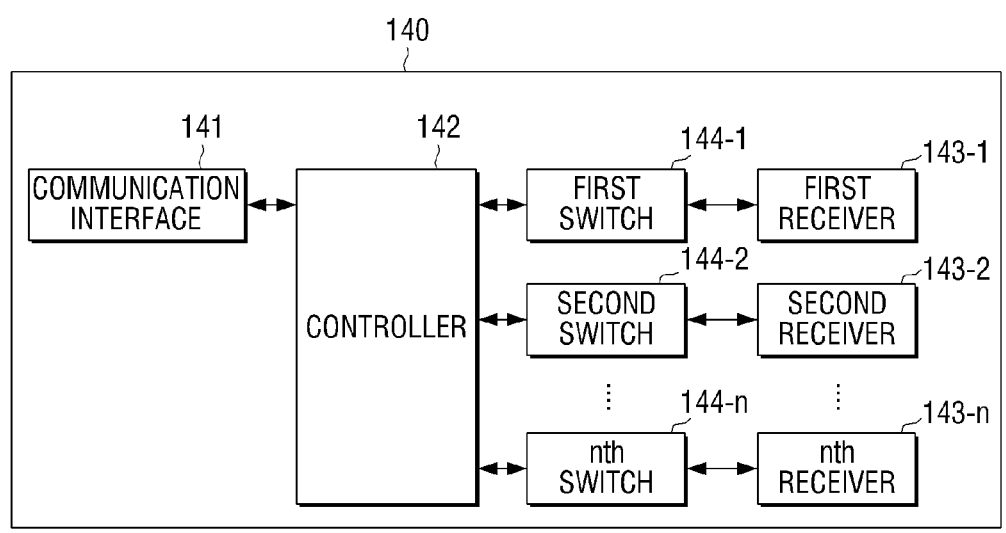
FIG. 2 is a block diagram illustrating a structure of an interface unit according to an exemplary embodiment.

FIG. 2 is a block diagram illustrating a detailed structure of the interface unit 140 according to an exemplary embodiment.

Referring to FIG. 2, the interface unit 140 includes a communication interface 141, a controller 142, a plurality of receivers 143-1, 143-2, . . . , and 143-n, and a plurality of switches 144-1, 144-2, . . . , and 144-n.

The communication interface 141 is formed to be connected to the elements of the media player device 100, transmits and receives the A/V signal and a control signal with the elements of the media player device 100, and receives power from the power unit 110.

The controller 142 controls elements of the interface unit 140. In more detail, the controller 142 senses whether the external devices 10-1, 10-2, . . . , and 10-n have been respectively connected to the plurality of receivers 143-1, 143-2, . . . , and 143-n. If it is sensed that the external devices 10-1, 10-2, . . . , and 10-n have been respectively connected to the plurality of receivers 143-1, 143-2, . . . , and 143-n, the controller 142 informs the Micom 120 that the external devices 10-1, 10-2, . . . , and 10-n have been respectively connected to the plurality of receivers 143-1, 143-2, . . . , and 143-n.

If the controller 142 receives the wake-up signal from the external devices 10-1, 10-2, . . . , and 10-n, the controller 142 transmits the wake-up signal to the Micom 120. The controller 142 combines the wake-up signal with port information corresponding to the external devices 10-1, 10-2, . . . , and 10-*n* which have transmitted the wake-up signal, to generate a wake-up start command and transmits the wake-up start command to the Micom 120.

The controller 142 determines whether the external devices 10-1, 10-2, . . . , and 10-*n* connected to the plurality of receives 143-1, 143-2, . . . , and 143-*n* are chargeable devices. If it is determined that the external devices 10-1, 10-2, . . . , and 10-*n* are the chargeable devices, the controller 142 transmits information about this to the Micom 120 so that the external devices 10-1, 10-2, . . . , and 10-*n* are charged. If the media player device 100 is in the standby mode, the controller 142 transmits the wake-up signal to the Micom 120.

If the external devices 10-1, 10-2, . . . , and 10-*n* are completely charged or the interface unit 140 is disconnected from the external devices 10-1, 10-2, . . . , and 10-*n*, the controller 142 transmits information about this to the Micom 120 so that the external devices 10-1, 10-2, . . . , and 10-*n* are completely charged.

If the controller 142 receives a wake-up start command with respect to the external device 10-2 from the Micom 120 or the external device 10-1, the controller 142 determines that it is necessary for the external device 10-2 to be woken up, based on the wake-up start command and transmits a wake-up signal through the receiver 143-2 connected to the external device 10-2.

The controller 142 determines types of interfaces of the external devices 10-1, 10-2, . . . , and 10-*n* which are connected to the plurality of receivers 143-1, 143-2, . . . , and 143-*n* and controls the switches 144-1, 144-2, . . . , and 144-*n* to apply interfaces corresponding to the determined interface types. In more detail, the interface unit 140 transmits and receives various types of data and the control signal with the external devices 10-1, 10-2, . . . , and 10-*n* through a new interface (NIF) type or a conventional interface type (e.g., a universal serial bus (USB) interface, a Micro USB interface, a mobile high-definition link (MHL) interface, a digital interface for video and audio (DiiVA) interface, or the like).

The NIF type refers to an interface type having a contact location as shown in FIG. 3 and will be referred to as an NIF. Therefore, the controller 142 determines whether the external devices 10-1, 10-2, . . . , and 10-*n* connected to the plurality of receivers 143-1, 143-2, . . . , and 143-*n* use the conventional interface type or the NIF type and controls the switches 144-1, 144-2, . . . , and 144-*n* corresponding to the external devices 10-1, 10-2, . . . , and 10-*n* to use the determined interface type.

The receivers 143-1, 143-2, . . . , and 143-*n* are connected to the external devices 10-1, 10-2, . . . , and 10-*n* through the cable connectors 300-1, 300-2, . . . , and 300-*n*. In more detail, the receivers 143-1, 143-2, . . . , and 143-*n* may include a plurality of contact locations of which numbers are sequentially designated. The contact locations are pins or terminals which are electrically connected to the cable connectors 300-1, 300-2, . . . , and 300-*n* through a plurality of interface types. The plurality of contact locations may have pin arrangements such as interface types as shown in FIG. 3 and may be compatible with a Micro USB connector as shown in FIG. 4.

The switches 144-1, 144-2, . . . , and 144-*n* are switched according to control of the controller 142 to select an interface type corresponding to an interface type applied to the external devices 10-1, 10-2, . . . , and 10-*n*. It has been described with reference to FIG. 2 that a plurality of switches are installed to correspond to the number of receivers. However, some receivers may be used only for a specific interface. In this case, the switches may be installed only in a receiver which supports a plurality of interfaces.

FIG. 3 is a view illustrating an NIF structure according to an exemplary embodiment.

In more detail, an interface according an exemplary embodiment includes a plurality of pair contact location groups to transmit a plurality of types of data and a ground contact location to process ground. Here, the pair contact location groups are a set of pins or terminals which transmit and receive an A/V signal, a control signal, etc. between a pair of media player devices using a differential signaling method. Here, differential signaling refers to technology for transmitting a pair of signals including a signal and a signal having an opposite phase to a phase of the signal.

Referring to FIG. 3, contact locations (or terminals) 1 and 2 correspond to a first pair contact location group which is designated to transmit first data. In more detail, the first pair contact location group includes a first pair plus contact location Lane0+ and a first pair minus contact location Lane0− which are for differential signaling. The first pair plus contact location may correspond to a VCC contact location of a Micro USB as shown in FIG. 4, and the first pair minus contact location may correspond to a Data-contact location of the Micro USB as shown in FIG. 4. The first pair contact location group may be used to perform a wake-up process.

Contact locations 3 and 4 are a second pair contact location group which is designated to transmit second data. In more detail, the second pair contact location group includes a second pair plus contact location Lane1+ and a second pair minus contact location Lane1− which are for differential signaling. The second pair plus contact location may correspond to a Data+ contact location of the Micro USB as shown in FIG. 4, and the second pair minus contact location may correspond to an ID contact location of the Micro USB as shown in FIG. 4. The second pair contact location group may be used to output power for charging an external device.

Contact location 5 is a ground contact location for processing ground. The ground contact location may correspond to a GND contact location of the Micro USB as shown in FIG. 4.

As described above, the NIF structure is compatible with a Micro USB interface as shown in FIG. 4 and supports an interface through which two types of data can be transmitted. A plurality of contact locations may be efficiently used so that an additional wake-up terminal is not used but a contact location is used to transmit audio/video/data (A/V/D).

It has been described with reference to FIG. 3 that the plurality of contact locations of FIG. 3 are compatible with the Micro USB. However, the plurality of contact locations of FIG. 3 may be respectively compatible with a USB interface and a MHL interface.

Also, it has been described with reference to FIG. 3 that an NIF has five contact locations. However, the NIF may have six contact locations, including a power contact location for transmitting specific power. Here, the power contact location may be designated as number 1 or 6. In this case, a plurality of contact locations may be compatible with a DiiVA interface.

Figure 5:
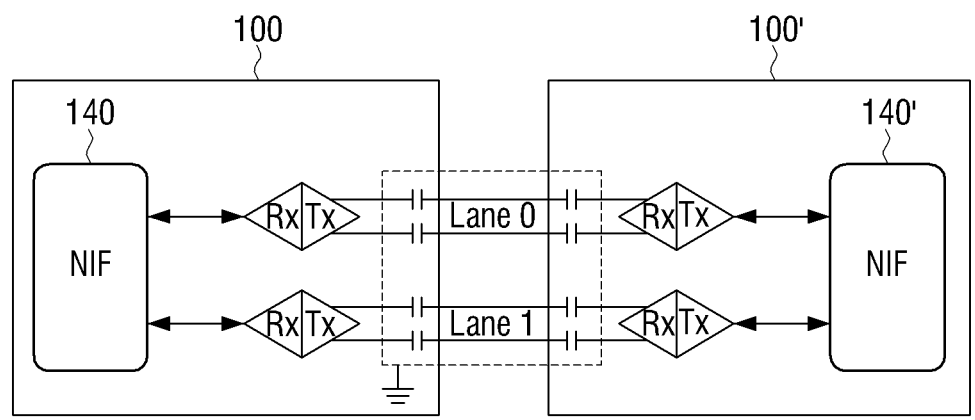
FIG. 5 is a view illustrating a method for transmitting and receiving data according to a new interface (NIF) structure, according to an exemplary embodiment.

FIG. 5 is a view illustrating a method for transmitting and receiving data according to an NIF structure, according to an exemplary embodiment.

Figure 6:
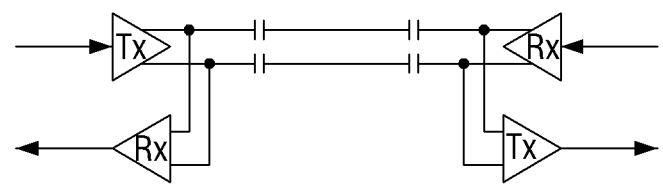
FIG. 6 is a view illustrating a lane structure of FIG. 1 in more detail.

Referring to FIG. 5, the NIF structure has two lane structures and transmits and receives one piece of A/V/D through one of the two lane structures. In more detail, the NIF structure transmits and receives first data through a first lane and second data through a second lane. The NIF structure transmits a wake-up signal, etc. using the first lane (or a first pair contact location group) and supplies charging power to an external device using the second lane (or a second pair contact location). In other words, the NIF structure charges the external device and simultaneously transmits A/V/D. A more detailed form of a lane structure is as shown in FIG. 6.

It has been described with reference to FIGS. 5 and 6 that one lane structure performs bidirectional communication. However, one lane structure may be realized as a transmission-only lane structure which transmits a signal to an external device, and the other lane structure may be realized as a reception-only lane structure which receives a signal from an external device. Also, it has been described with reference to FIGS. 5 and 6 that all lines of one lane structure perform bidirectional communications. However, one line of the one lane structure may be realized as a transmission-only line through which a signal is transmitted to an external device, and the other line of the one lane structure may be realized as a reception-only line through which a signal is received from an external device.

Figure 7:
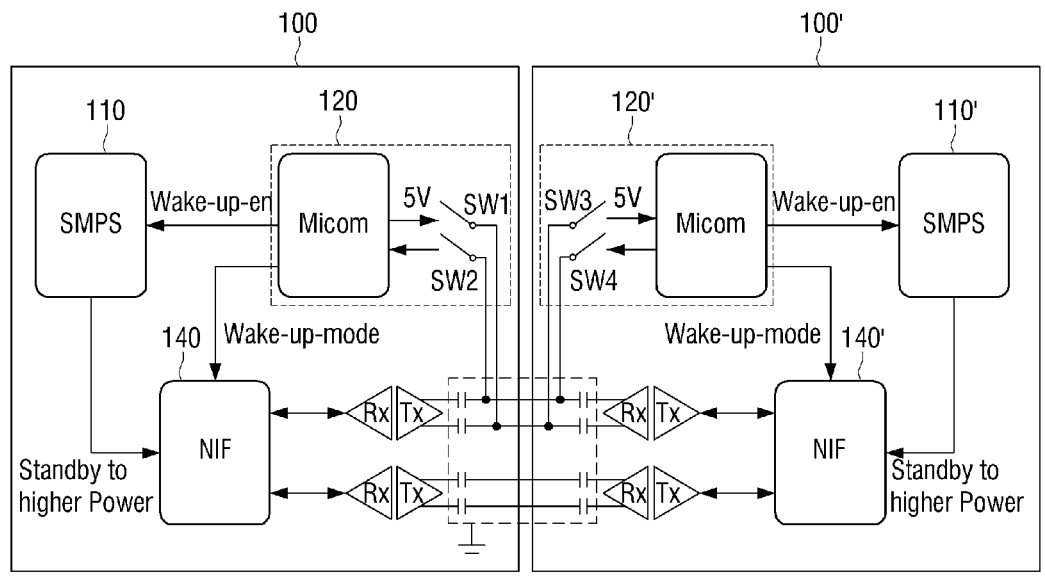
FIG. 7 is a view illustrating a wake-up method which is performed according to an NIF structure, according to an exemplary embodiment.

FIG. 7 is a view illustrating a wake-method which is performed according to an NIF structure, according to an exemplary embodiment.

Wake-up operations are divided into a wake-up operation for waking up a media player device 100 and a wake-up operation performed by the media player device 100 to wake up an external device 100'. The wake-up operation for waking up the media player device 100 will now be described.

Referring to FIG. 7, an interface unit (NIF) 140 is connected to the external device (including a portable device) 100' through a cable connector. A Micom 120 is connected to a pair contact location group of a plurality of contact locations using switches.

The Micom 120 recognizes a connection of the external device 100' using two of the plurality of contact locations. In more detail, the Micom 120 checks the connection of the external device 100' using a first pair contact location of the plurality of contact locations which are connected to the external device 100'.

If it is sensed that the external device 100' is connected to the media player device 100, the Micom 120 controls a power unit (SMPS) 110 and the interface unit 140 to wake up the media player device 100.

If a wake-up signal is received from the external device 100' which has been connected to the media player device 100, the Micom 120 performs a wake-up operation. For example, if the media player device 100 enters a standby mode when the external device 100' is connected to the media player device 100, the Micom 120 controls the power unit 110 and the interface unit 140 to wake up the media player device 100 if the wake-up signal is received from the external device 100'. Here, the wake-up signal may be received through a first pair minus contact location as described above.

The wake-up operation performed by the media player device 100 to wake up the external device 100' will now be described.

Figures 11, 12:
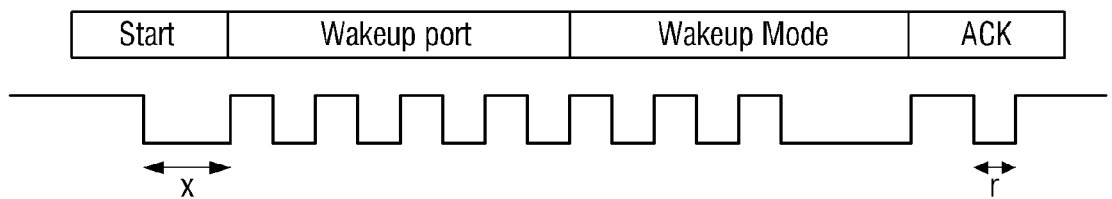
FIG. 11 is a view illustrating a structure of a wake-up start command according to an exemplary embodiment.
FIG. 12 is a view illustrating functions of fields of a wake-up start command according to an exemplary embodiment.

If it is necessary for the external device 100' to be woken up, the Micom 120 transmits a wake-up start command as shown in FIG. 11 to the interface unit 140. Here, the wake-up start command includes a start field which signals a start of a wake-up command, a wake-up port field which signals a device which is to be woken up, a wake-up mode field which signals a mode of a wake-up, and an Ack signal field.

Figure 10:
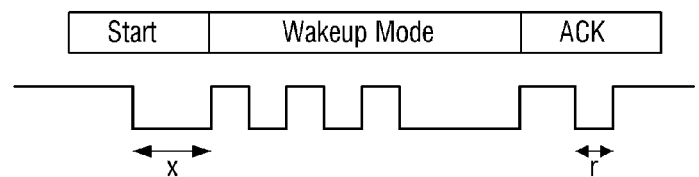
FIG. 10 is a view illustrating a structure of a wake-up signal according to an exemplary embodiment.

The interface unit 140 which has received the wake-up start command determines the external device 100' to be woken up with reference to the wake-up port field of the wake-up start command. The interface unit 140 also transmits a wake-up signal as shown in FIG. 10 to a receiver connected to the external device 100', i.e., a corresponding external device. Here, the wake-up signal may include a start field which signals a start of a wake-up command omitting a wake-up port field of a wake-up start command, a wake-up mode field which signals a mode of a wake-up, and an Ack signal field.

The interface unit 140 transmits the wake-up signal to the external device 100' using a first pair contact location group of the plurality of contact locations. Alternatively, the interface unit 140 may transmit the wake-up signal to the external device 100' using only one contact location.

It has been described that the media player device 100 generates a wake-up start command with respect to a specific external device and transmits the wake-up start command to the specific external device. However, the wake-up start command may be received from the external device 100'. Also, it has been described that the interface unit 140 transmits the wake-up start command to the external device 100'. However, the Micom 120 may directly transmit the wake-up start command to the external device 100'.

It has been described with reference to FIG. 7 that one pair contact location group of a plurality of contact locations is used to sense a connection of an external device and receive a wake-up signal. However, only one contact location may be used to sense the connection of the external device and receive the wake-up signal. This will be described with reference to FIG. 8.

Figure 8:
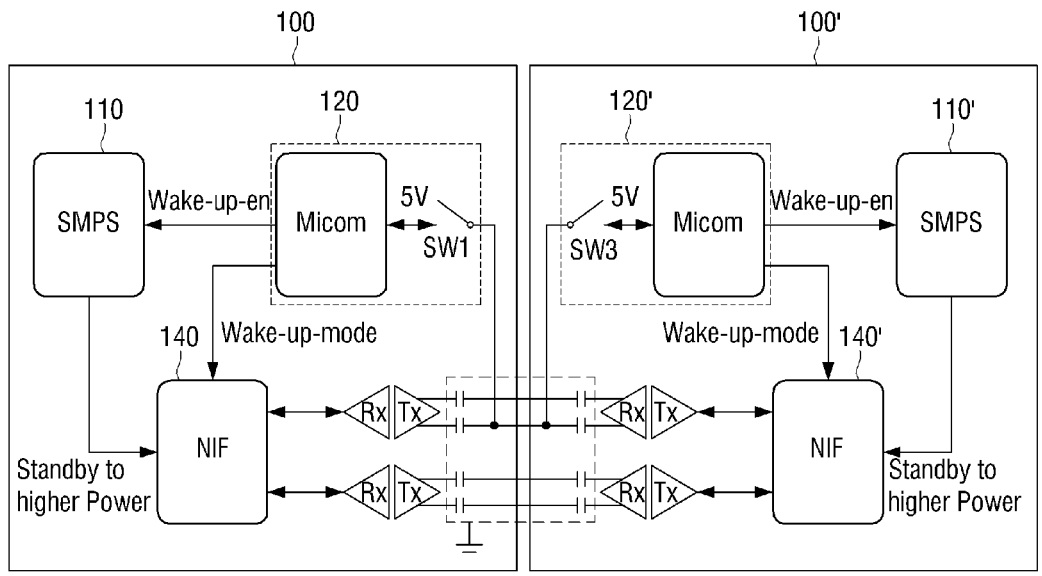
FIG. 8 is a view illustrating a wake-up method which is performed according to an NIF structure, according to another exemplary embodiment.

FIG. 8 is a view illustrating a wake-up method which is performed according to an NIF structure, according to another exemplary embodiment.

Referring to FIG. 8, a new interface unit (NIF) 140 is connected to an external device (including a portable device) 100' through a cable connector. A Micom 120 is connected to one of a plurality of contact locations using a switch SW1.

The Micom 120 recognizes a connection of the external device 100' using one of the plurality of contact locations. In more detail, the Micom 120 checks the connection of the external device 100' using a first pair minus contact location of the plurality of contact locations which are connected to the external device 100'.

If it is sensed that the external device 100' has been connected to a media player device 100, the Micom 120 controls a power unit (SMPS) 110 and the interface unit 140 to wake up the media player device 100.

If a wake-up signal is received from the external device 100' which has been connected to the media player device 100, the Micom 120 performs a wake-up operation. For example, if the media player device 100 enters a standby mode when the external device 100' is connected to the media player device 100, the Micom 120 controls the power unit 110 and the interface unit 140 to wake up the media player device 100 if the wake-up signal is received from the external device 100'. Here, the wake-up signal may be received through a first pair minus contact location as described above.

A wake-up operation performed by the media player device 100 of FIG. 8 to wake up the external device 100' is the same as the wake-up operation performed by the media player device 100 of FIG. 7, except that a wake-up signal is transmitted using only one contact location. Therefore, repeated descriptions will be omitted herein.

It has been described with reference to FIGS. 7 and 8 that the Micom 120 directly senses a signal received from two of a plurality of contact locations to recognize a connection of an external device and receives a wake-up signal. However, the interface unit 140 may sense the connection of the external device and receive the wake-up signal. This will be described below with reference to FIG. 9.

Figure 9:
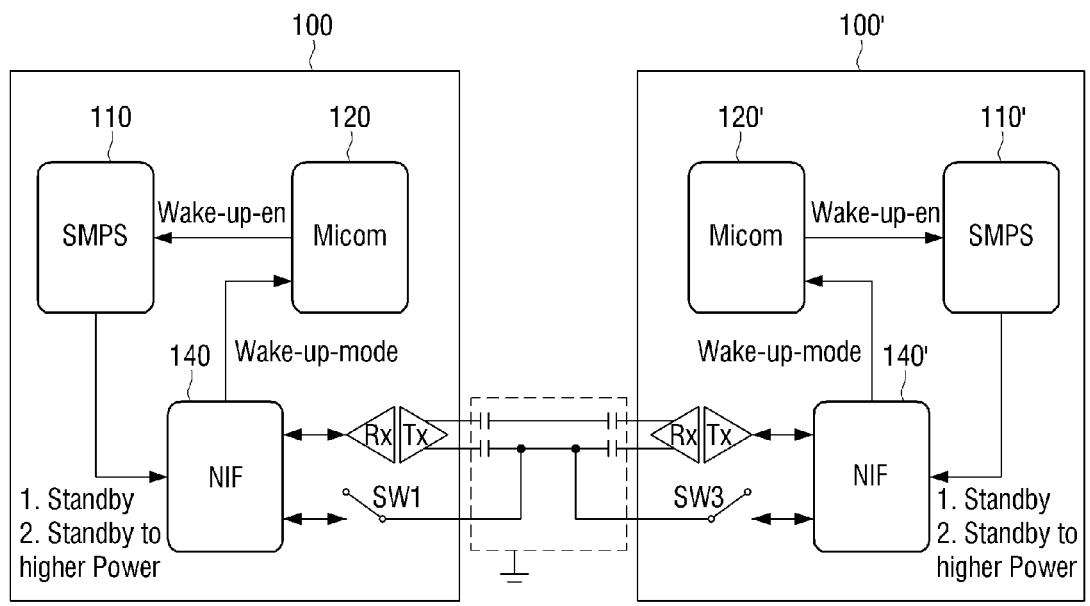
FIG. 9 is a view illustrating a wake-up method which is performed according to an NIF structure, according to another exemplary embodiment.

FIG. 9 is a view illustrating a wake-up method performed according to an NIF structure, according to another exemplary embodiment.

Referring to FIG. 9, a new interface unit (NIF) 140 is connected to an external device (including a portable device) 100' through a cable connector.

The interface unit 140 recognizes a connection of the external device 100' using one of a plurality of contact locations. In more detail, the interface unit 140 checks the connection of the external device 100' using a first pair minus contact location of the plurality of contact locations which are connected to the external device 100'.

If the external device 100' is connected to the media player device 100, the interface unit 140 informs the Micom 120 that the external device 100' has been connected to the media player device 100. If the media player device 100 is in a standby mode, the interface unit 140 transmits a wake-up signal to the Micom 120. Here, the Micom 120 which has received the wake-up signal controls the power unit 110 to wake up the media player device 100.

If the interface unit 140 receives a wake-up signal from the external device 100', the interface unit 140 transmits the wake-up signal to the Micom 120. For example, if the media player device 100 enters the standby mode when the external device 100' is connected to the media player device 100, the interface unit 140 transmits the wake-up signal to the Micom 120 to wake up the media player device 100 if the wake-up signal is received from the external device 100'. Here, the wake-up signal may be received through a first pair minus contact location as described above.

The interface unit 140 combines the wake-up signal with port information corresponding to the external device 100' which has transmitted the wake-up signal, to generate a wake-up start command and transmits the wake-up start command to the Micom 120.

FIG. 10 is a view illustrating a structure of a wake-up signal according to an exemplary embodiment.

Referring to FIG. 10, the wake-up signal includes a start field, a wake-up mode field, and an Ack signal field.

The start field is a field which signals a start of a wake-up command and is a signal which is decreased from a high level to a low level and then maintained on the low level for a preset time. The start field may be a signal which is increased from the low level to the high level and then maintained on the high level for a preset time.

The wake-up mode field is a field which signals a mode of a wake-up and may have a mode as shown in FIG. 13.

The Ack signal field is a signal through which the external device 100' having received the wake-up signal informs the interface unit 140 having transmitted the wake-up signal, that the external device 100' has received the wake-up signal.

FIG. 11 is a view illustrating a structure of a wake-up start command according to an exemplary embodiment.

Referring to FIG. 11, the wake-up start command includes a start field, a wake-up port field, a wake-up mode field, and an Ack signal field.

The start field is a field which signals a start of a wake-up command and is a signal which is decreased from a high level to a low level and then maintained on the low level for a preset time. The start field may be a signal which is increased from the low level to the high level and then maintained on the high level for a preset time.

The wake-up port field is a field which signals a media player device which is to be woken up.

The wake-up mode field is a field which signals a mode of a wake-up and may have a mode as shown in FIG. 13.

The Ack signal field is a signal through which the external device 100' having received the wake-up signal informs the interface unit 140 or the Micom 120 having transmitted the wake-up signal, that the external device 100' has received the wake-up signal.

FIG. 12 is a view illustrating functions of fields of a wake-up start command according to an exemplary embodiment.

Referring to FIG. 12, a start field is a field to which a signal decreased from a high level to a low level is transmitted. A wake-up port field is a field to which a signal for designating a port corresponding to a specific one of a plurality of external devices is transmitted. A wake-up mode field is a field to which a signal for designating an operation mode of an external device is transmitted. An Ack signal field is a field to which a signal for acknowledging a successful reception of a wake-up signal is transmitted.

FIG. 13 is a view illustrating types of the wake-up mode of FIG. 12, according to an exemplary embodiment.

Referring to FIG. 13, the wake-up mode includes a plurality of wake-up modes Wakeup 1 step, Wakeup 2 step, and Wakeup 3 step respectively corresponding to a plurality of operation modes of a media player device, a charging-only mode, and a normal mode. An operation mode of an external device may be designated in detail using various types of signals as described above to wake up the external device 100'.

FIG. 14 is a view illustrating operations of the wake-up mode of FIG. 13, according to an exemplary embodiment.

Referring to FIG. 14, an off mode refers to a mode in which power is not supplied to a media player device.

A standby mode refers to a standby mode of minimum power in which an external signal is sensed through an infrared (IR) receiver and an NIF.

"Wakeup1" refers to a wake-up mode in which the media player device does not perform Internet Protocol (IP)-based communication.

"Wakeup2" refers to a wake-up mode in which the media player device performs IP-based communication.

"Wakeup3" refers to a wake-up mode in which the media player device supports a multiport.

"Wakeup?" refers to a wake-up mode in which all functions are possible except for a specific function.

"Normal" mode refers to a mode in which all functions of the media player device are performed.

Figure 15:
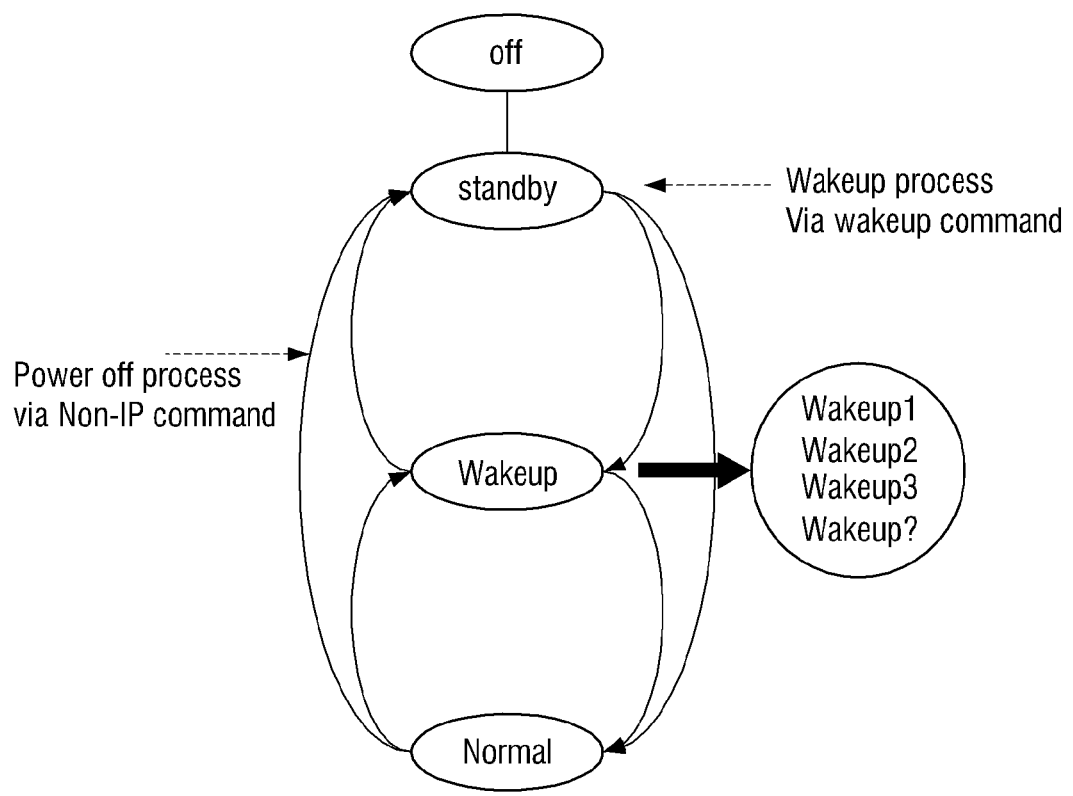
FIG. 15 is a view illustrating a state transition of a wake-up mode according to an exemplary embodiment.

FIG. 15 is a view illustrating a state transition of a wake-up mode according to an exemplary embodiment.

If power is not supplied to a media player device, the media player device is in an off mode. If power is supplied to the media player device, the media player device changes from the off mode to a standby mode.

If an external device is connected to the media player device or a wake-up signal is input from the external device when the media player device is in the standby mode, the media player device changes from the standby mode to an operation mode which depends on a wake-up mode of the input wake-up signal.

If a command of a user is input or a wake-up signal, which is for informing the media player device that the media player device is to operate in a normal mode, is input from an external device when the media player device is in the wake-up mode, the media player device changes from the wake-up mode to the normal mode.

If a specific operation ends or the command of the user is input when the media player device is in the wake-up mode, the media player device changes from the wake-up mode to the standby mode.

If the specific operation ends or a preset time elapses when the media player device is in the normal mode, the media player device changes from the normal mode to the wake-up mode.

If the media player device receives a power off command from the user when the media player device is in the normal mode, the media player device changes from the normal mode to the standby mode for standing by at minimum power.

Figure 16:
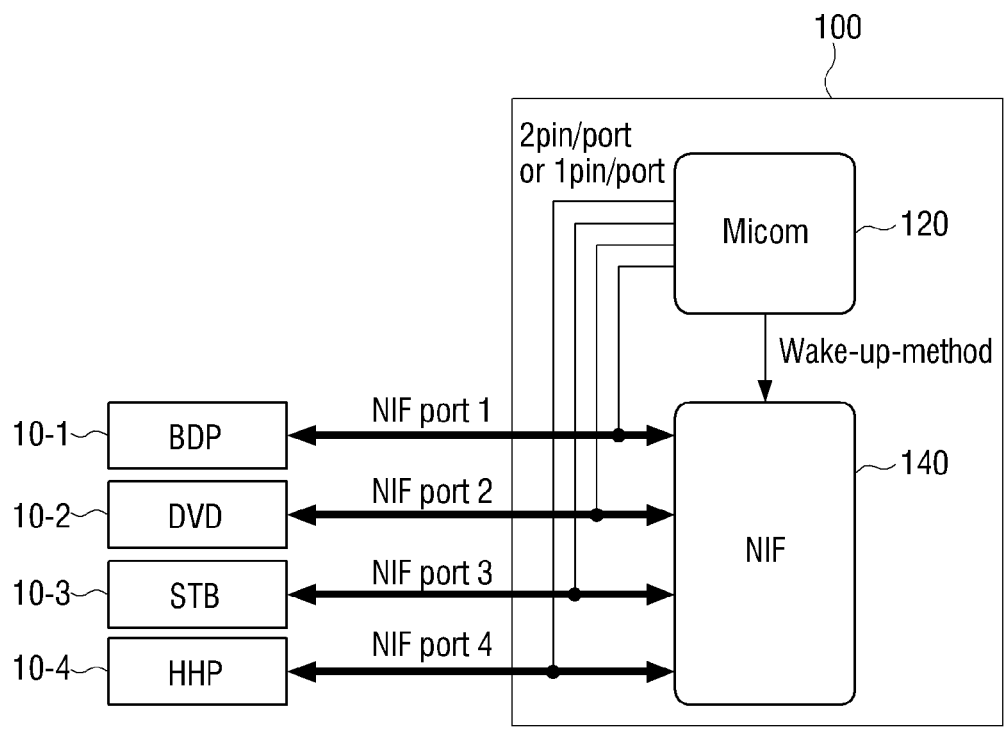
FIGS. 16 and 17 are views illustrating a wake-up method if a plurality of external devices are connected to a media player device, according to exemplary embodiments.
Figure 17:
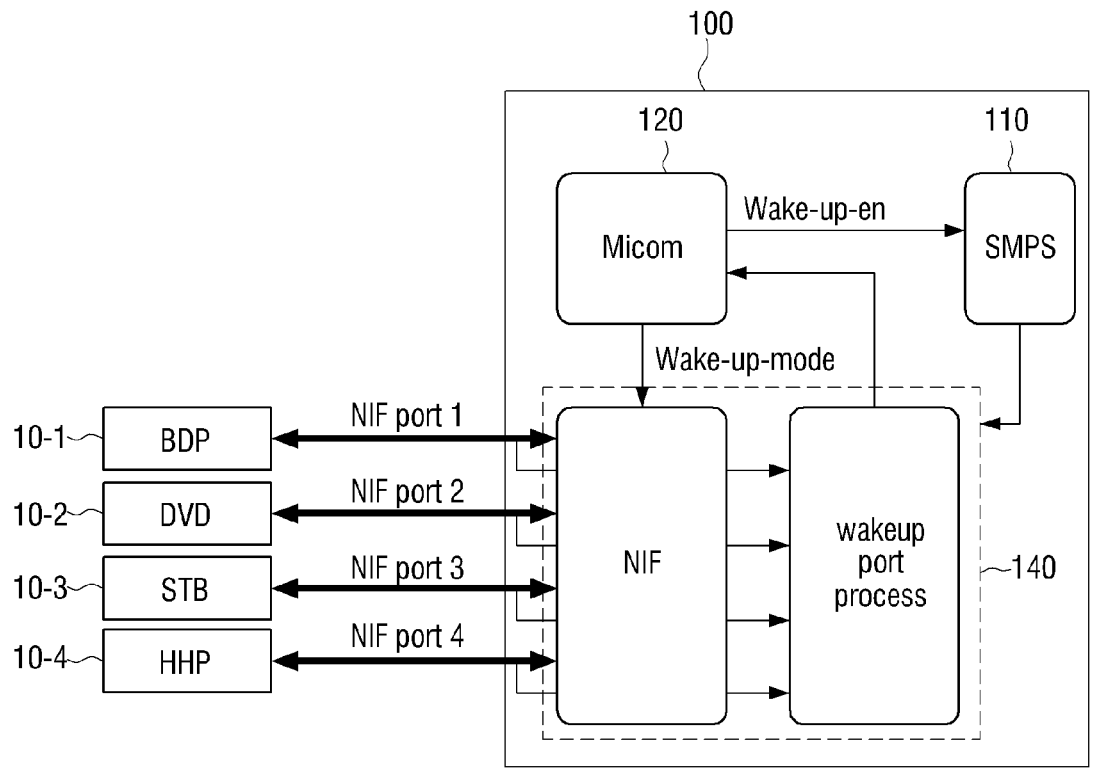

FIGS. 16 and 17 are views illustrating a wake-up method if a plurality of external devices are connected to a media player device, according to exemplary embodiments.

In more detail, FIG. 16 is a view illustrating an operation of a Micom 120 for receiving and processing a wake-up signal with respect to the plurality of external devices.

Referring to FIG. 16, a plurality of external devices 10-1, 10-2, 10-3, and 10-4 are respectively connected to a plurality of pair contact location groups. Also, a Micom 120 is connected to each of the pair contact location groups. In more detail, the first external device 10-1 is connected to a first pair contact location group NIF port1, and the second external device 10-2 is connected to a second pair contact location group NIF port2. Also, the third external device 10-3 is connected to a third pair contact location group NIF port3, and the fourth external device 10-4 is connected to a fourth pair contact location group NIF port4.

The Micom 120 may sense a connection of an external device through a pair contact location connected to the external device, or may receive a wake-up signal from the external device. A detailed connection of the Micom 120 to one device is as shown in FIG. 7.

If the wake-up signal is received, the Micom 120 controls elements of a media player device 100 to operate the media player device 100 in a wake-up mode corresponding to the wake-up signal.

It has been described with reference to FIG. 16 that each of pair contact location groups connected to external devices is connected to the Micom 120. However, only one of the pair contact location groups may be connected to the Micom 120. In this case, a connection between one external device and the media player device 100 is as shown in FIG. 8.

FIG. 17 is a view illustrating an operation of an interface unit 140 for receiving and processing a wake-up signal with respect to a plurality of external devices.

Referring to FIG. 17, a plurality of external devices 10-1, 10-2, 10-3, and 10-4 are respectively connected to a plurality of pair contact location groups. In more detail, the first external device 10-1 is connected to a first pair contact location group NIF port1, and the second external device 10-2 is connected to a second pair contact location group NIF port2. Also, the third external device 10-3 is connected to a third pair contact location group NIF port3, and the fourth external device 10-4 is connected to a fourth pair contact location group NIF port4.

The interface unit 140 may sense a connection of an external device through a pair contact location group connected to the external device or receive a wake-up signal from the external device. A detailed connection of the interface unit 140 to one device is as shown in FIG. 9.

If an external device is connected to a media player device 100, the interface unit 140 informs the Micom 120 of the connection of the external device to the media player device 100. If the external device is connected to the media player device 100 or a wake-up signal is received from the external device when the media player device 100 is in a standby mode, the interface unit 140 transmits the wake-up signal to the Micom 120.

If the Micom 120 receives the wake-up signal from the interface unit 140, the Micom 120 controls elements of the media player device 100 to operate the media player device 100 in a wake-up mode corresponding to the wake-up signal.

Figure 18:
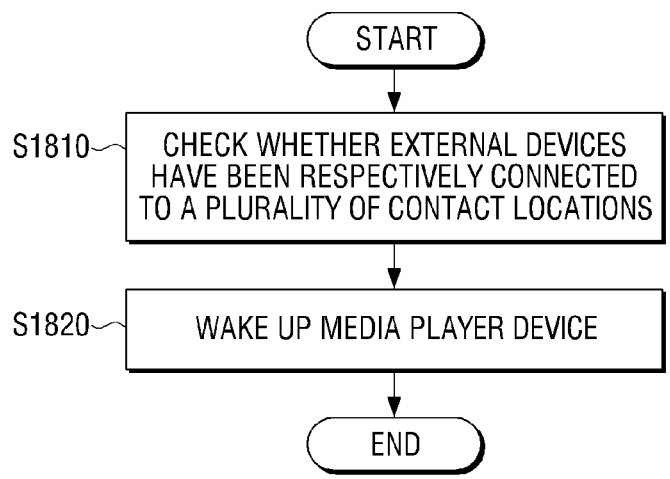
FIG. 18 is a flowchart illustrating a wake-up method according to an exemplary embodiment.

FIG. 18 is a flowchart illustrating a wake-up method according to an exemplary embodiment.

When a media player device is in a standby mode, a determination is made as to whether external devices have been respectively connected to a plurality of contact locations (S1810).

If the external devices are connected to the media player device, the media player device is woken up (S1820). If a wake-up signal is received from the external devices connected to the media player device, the media player device may be woken up.

Figure 19:
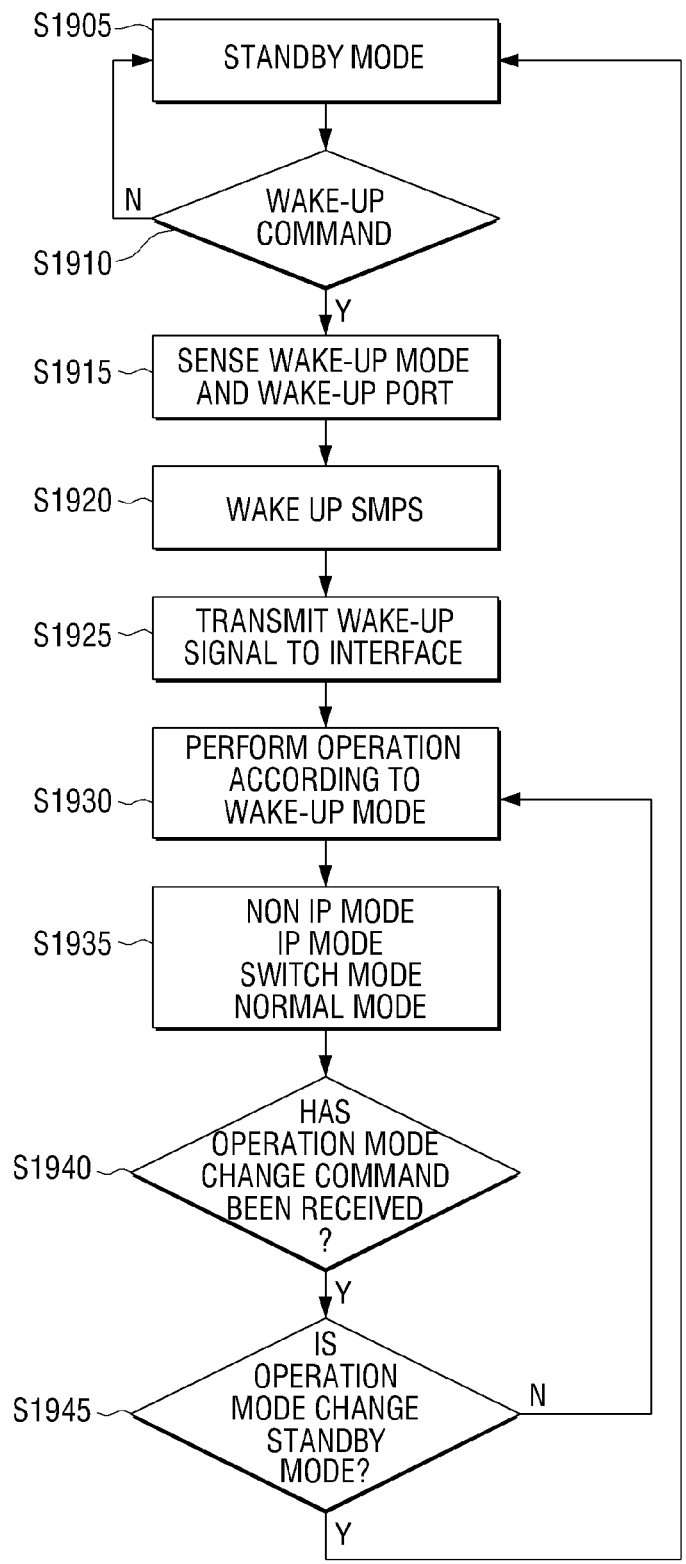
FIG. 19 is a flowchart illustrating a wake-up operation of FIG. 18 in more detail.

FIG. 19 is a flowchart illustrating a wake-up operation of FIG. 18 in more detail.

The media player device enters a standby mode (S1905). A determination is made as to whether a wake-up signal has been received from an external device (S1910). If it is determined that the wake-up signal has been received from the external device (S1910-Y), the external device which has transmitted the wake-up signal is determined using the wake-up signal, and a wake-up mode requested by the corresponding external device is determined (S1915).

The power unit 110 is controlled to output power according to a wake-up mode of the wake-up signal (S1920). The interface unit 120 is woken up to perform an operation which depends on the wake-up mode (S1925).

The operation depending on the wake-up mode is performed (S1930 and S1935). In more detail, if the wake-up mode of the wake-up signal received from an external device is a charging mode, charging power may be provided to a pair contact location to which the corresponding external device is connected.

A determination is made as to whether a user command has been received or a mode change command has been received from the external device (S1940). If it is determined that the user command has been received or the mode change command has been received from the external device (S1940-Y), a mode change corresponding to the mode change command is performed. If the mode change is the standby mode (S1945), elements of the media player device are controlled to operate the media player device in the standby mode in which the media player device operates at minimum power. If a mode change command is received, the media player device is controlled to operate in a mode corresponding to the mode change command.

As described above, in the wake-up method according to an exemplary embodiment, standby is performed at minimum standby power. Also, a wake-up signal is received and used using a contact location for transmitting an A/V signal and not by a contact location for transmitting an additional wake-up signal. Therefore, a plurality of contact locations connected to external devices are efficiently used. The wake-up method described with FIGS. 18 and 19 may be executed in a media player device having a structure as shown in FIG. 1 and may be executed in a control device having other structures.

The foregoing exemplary embodiments and advantages are merely exemplary and are not to be construed as limiting the inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for waking up a media player device comprising a plurality of contact locations supporting a plurality of interfaces, the method comprising:

when the media player device is in a standby mode, checking whether an external device is connected to the plurality of contact locations supporting the plurality of interfaces; and if the external device is connected to the media player device, waking up the media player device, wherein if a wake-up signal is received from the external device connected to the media player device, the media player device is woken up;

wherein the wake-up signal comprises a start field which signals a start of a wake-up command, a wake-up mode field which signals a mode of a wake-up, and an Ack signal field; and wherein the mode of the wake-up comprises a plurality of wake-up modes respectively corresponding to a plurality of operation modes of the media player device.

2. The method as claimed in claim 1, wherein the plurality of contact locations comprise:

a first pair contact location group which transmits first data; and a second pair contact location group which transmits second data, wherein whether the external device is connected to the plurality of contact locations is checked through the first pair contact location group.

3. The method as claimed in claim 2, wherein the first pair contact location group comprises a first pair plus contact location and a first pair minus contact location for differential signaling.

4. The method as claimed in claim 1, wherein whether the external device is connected to the plurality of contact locations is checked using an audio-visual (A/V) data transmission-only contact location of the plurality of contact locations.

5. The method as claimed in claim 1, wherein the mode of the wake-up further comprises a charging-only mode.

6. The method as claimed in claim 5, wherein the plurality of wake-up modes comprise:

a first wake-up mode in which the media player device does not perform Internet Protocol (IP)-based communication;

a second wake-up mode in which the media player device performs IP-based communication;

a third wake-up mode in which the media player device supports a multiport; and a fourth wake-up mode in which the media player device performs all functions.

7. The method as claimed in claim 1, wherein the start field is a signal which is decreased from a high level to a low level and then maintained on the low level for a preset time or a signal which is increased from the low level to the high level and then maintained on the high level for a preset time.

8. The method as claimed in claim 1, wherein the wake-up signal is transmitted using an A/V data transmission-only contact location of the plurality of contact locations.

9. The method as claimed in claim 1, wherein the media player device is connected to a plurality of external devices through the plurality of contact locations.

10. The method as claimed in claim 9, wherein the plurality of contact locations comprise a plurality of pair contact location groups which transmit specific data, and wherein the plurality of pair contact location groups are respectively connected to the plurality of external devices.

11. The method as claimed in claim 1, wherein the plurality of contact locations are mapped to correspond to at least one of a high definition multimedia interface (HDMI) connector, a Micro universal serial bus (USB) connector, a Mini USB connector, a USB connector, a mobile high-definition link (MHL) connector, and a digital interface for video and audio (DiiVA) connector.

12. A media player device comprising a plurality of contact locations supporting a plurality of interfaces, the media player device comprising:

a power unit which outputs standby power or main power;

an interface unit which senses whether an external device has been connected to the plurality of contact locations; and a controller which controls the power unit to wake up the media player device if the external device is connected to the media player device, wherein the controller wakes up the media player device if a wake-up signal is received from the external device connected to the media player device;

wherein the wake-up signal comprises a start field which signals a start of a wake-up command, a wake-up mode field which signals a mode of a wake-up, and an Ack signal field; and wherein the mode of the wake-up comprises a plurality of wake-up modes respectively corresponding to a plurality of operation modes of the media player device.

13. The media player device as claimed in claim 12, wherein the plurality of contact locations comprise:

a first pair contact location group which transmits first data; and a second pair contact location group which transmits second data, wherein the interface unit checks whether the external device is connected to the media player device, through the first pair contact location group.

14. The media player device as claimed in claim 13, wherein the first pair contact location group comprises a first pair plus contact location and a first pair minus contact location for differential signaling.

15. The media player device as claimed in claim 12, wherein the interface unit checks whether the external device is connected to the media player using an A/V data transmission-only contact location of the plurality of contact locations.

16. The media player device as claimed in claim 12, wherein the mode of the wake-up further comprises a charging-only mode.

17. The media player device as claimed in claim 16, wherein the plurality of wake-up modes comprise:

a first wake-up mode in which the media player device does not perform IP-based communication;

a second wake-up mode in which the media player device performs IP-based communication;

a third wake-up mode in which the media player device supports a multiport; and a fourth wake-up mode in which the media player device performs all functions.

18. The media player device as claimed in claim 12, wherein the start field is a signal which is decreased from a high level to a low level and then maintained on the low level for a preset time, or a signal which is increased from the low level to the high level and then maintained on the high level for a preset time.

19. The media player device as claimed in claim 12, wherein the wake-up signal is transmitted using an A/V data transmission-only contact location of the plurality of contact locations.

20. The media player device as claimed in claim 12, wherein the media player device is connected to a plurality of external devices through the plurality of contact locations.

21. The media player device as claimed in claim 20, wherein the plurality of contact locations comprise a plurality of pair contact location groups which transmit specific data, and wherein the plurality of pair contact location groups are respectively connected to the plurality of external devices.

22. The media player device as claimed in claim 20, wherein:

the interface unit determines that the external device transmitted a wake-up signal if the wake-up signal is received from the external device, generates a wake-up start command corresponding to the determined external device, and transmits the wake-up start command to the controller; and the controller wakes up the media player device if the wake-up start command is received from the interface unit.

23. The media player device as claimed in claim 22, wherein the wake-up start command comprises a start field which signals a start of a wake-up command, a wake-up port field which signals the media player device which is to be woken up, a wake-up mode field which signals a mode of a wake-up, and an Ack signal field.

24. The media player device as claimed in claim 12, wherein the plurality of contact locations are mapped to correspond to at least one of a high definition multimedia interface (HDMI) connector, a Micro universal serial bus (USB) connector, a Mini USB connector, a USB connector, a mobile high-definition link (MHL) connector, and a digital interface for video and audio (DiiVA) connector.

25. The method as claimed in claim 1, wherein if the external device receives a wake-up signal from the media player that is connected to the external device, the external device is woken up.

26. The method as claimed in claim 25, wherein the wake-up signal comprises a start field which signals a start of a wake-up command, a wake-up mode field which signals a mode of a wake-up, and an Ack signal field.

27. The media player device as claimed in claim 12, wherein if the external device receives a wake-up signal from the media player that is connected to the external device, the external device is woken up.

28. The media player device as claimed in claim 27, wherein the wake-up signal comprises a start field which signals a start of a wake-up command, a wake-up mode field which signals a mode of a wake-up, and an Ack signal field.

29. The method as claimed in claim 1, wherein the media player device is configured to send a wake-up signal to another external device connected to the media player device.

30. The media player device as claimed in claim 12, wherein the media player device is configured to send a wake-up signal to another external device connected to the media player device.

* * * * *